Quackenbush & Hawn,
Bread Pan.

No. 99,109. Patented Jan. 25, 1870.

Witnesses        Inventor

United States Patent Office.

ABRAM I. QUACKENBUSH AND GUILFORD HAWN, OF FORT PLAIN, NEW YORK.

Letters Patent No. 99,109, dated January 25, 1870.

IMPROVED DEVICE FOR BAKING BREAD.

The Schedule referred to in these Letters Patent and making part of the same.

*To all whom it may concern:*

Be it known that we, ABRAM I. QUACKENBUSH and GUILFORD HAWN, of Fort Plain, in the county of Montgomery, and State of New York, have invented a new and Useful Device to be used in Baking Bread; and we do hereby declare that the following is a full, clear, and exact description thereof, reference being had to the accompanying drawings, making part of this specification, in which—

Similar letters of reference indicate corresponding parts in the two figures.

During the operation of baking bread, under the method hitherto adopted, the entire surface of the loaf is exposed to the heat of the oven, which allows the liquids with which the dough is mixed to evaporate and pass off, through the flues of the oven, into the chimney, in the form of steam. Thus a large proportion of the essence and nutritious qualities of the flour is lost, which leaves the bread baked in this way dry and husky.

To remedy this objection, the nature of our invention consists in an apparatus for receiving the dough, and so confining it, during the operation of baking, that the vapors are, in a great measure, prevented from escaping, and many good results thereby obtained, as will be hereinafter explained.

To enable others skilled in the art to understand our invention, we will describe its construction and operation.

In the accompanying drawings—

A represents a flanged pan, which may be made of a rectangular or other form, and of any required size.

From the edges or sides of this pan, flanges rise, to the inner sides of which lips $a\ a$ are secured, so as to leave narrow spaces between them and the bottom of the pan. The lips $a$ may be continuous or not, as circumstances require.

Figure 1:
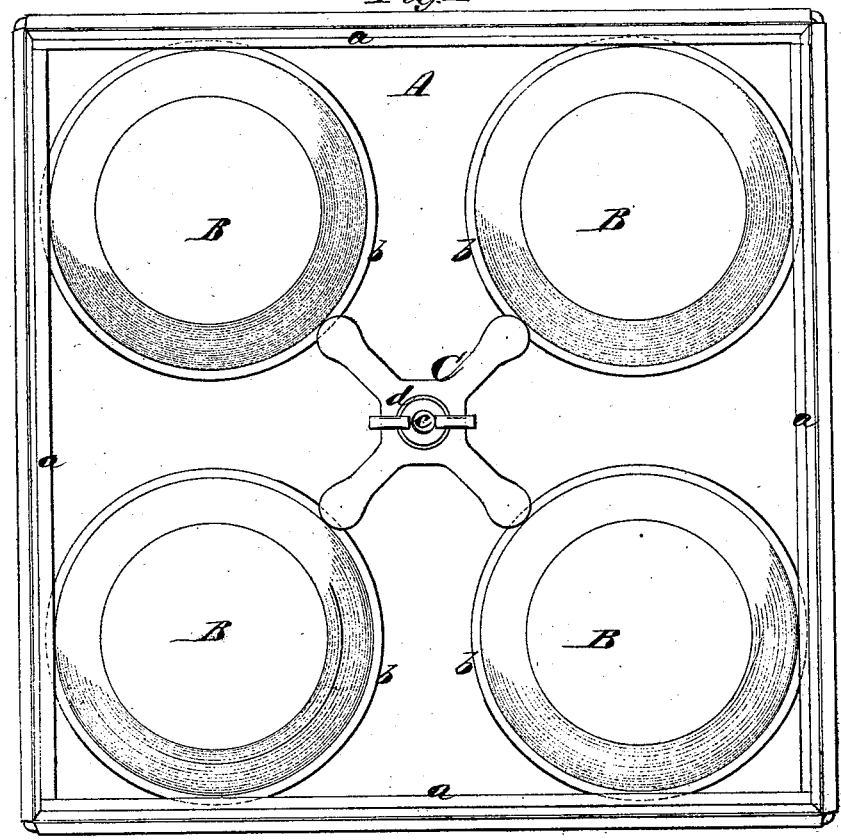
Figure 1 is a top view of the device, adapted for four loaves.
Figure 2:
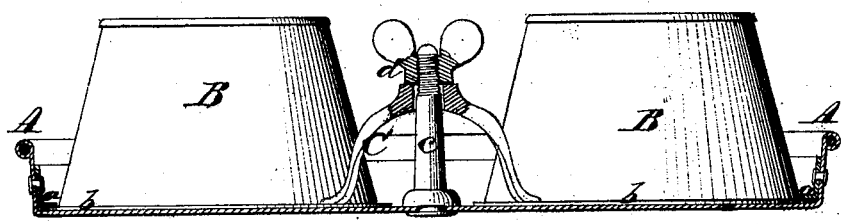
Figure 2 is a vertical transverse section, through the centre of fig. 1.

From the centre of the pan A, a post, $c$, rises perpendicularly, which is permanently fixed to the pan, as shown in fig. 2.

The upper end of post $c$ has a male-screw thread cut on it, for receiving a thumb-nut, $d$.

C is a spider-clamp, having four legs, the feet of which are flattened, as shown in the drawings. Through the body of this spider C, a hole is made vertically for receiving loosely the upper end of the post $c$, as shown in the drawings.

B B B B are four cups, of any required size and shape, which are constructed with circular flanges, $b$, around their open ends, or those ends which lie upon the bottom of the pan A.

The dough is put into the cups B, and the latter inverted upon the pan A, and adjusted so that their flanges are received beneath the lips $a$. The spider C is then adjusted on post $c$, so that the feet of this spider rest upon a flange, $b$, of each cup B, after which the nut $d$ is screwed down tightly, thus confining the cups in their places. The pan, with its cups, are then introduced into an oven, and the dough, which is in the cups, baked.

We have represented means for baking four loaves of bread at one time, but it is obvious that these means may be modified, for baking a less or greater number of loaves.

It will be seen, from the above description, that we provide for confining the gases and vapors within and about the dough, during the operation of baking it. At the same time we form a mould for the loaf, so that in baking a number of loaves, they will be of the same size and shape.

The following are other advantages growing out of our improved mode of baking bread:

The nutritious qualities of the flour are retained; uniformity in results; moistness, and comparative freedom from mould; the bread is comparatively steam-baked; and a uniform thickness and color of crust are obtained.

Having described our invention,

What we claim as new, and desire to secure by Letters Patent, is—

1. The combination of the clamp, or its equivalent, with a cup, B, and pan A, substantially as described.

2. The construction of the pan A, with lips $a$, adapted to receive flanges $b$, on the cups B, substantially as described.

ABRAM I. QUACKENBUSH.
GUILFORD HAWN.

Witnesses:
A. H. AYRES,
L. P. COE.